United States Patent

[11] 3,589,411

| [72] | Inventor | Clarence W. Vogt |
| | | Box 232, Westport, Conn. 06880 |
| [21] | Appl. No. | 700,771 |
| [22] | Filed | Jan. 26, 1968 |
| [45] | Patented | June 29, 1971 |

[54] FILLING APPARATUS
5 Claims, 19 Drawing Figs.

[52] U.S. Cl. .................................................. 141/71,
141/67, 141/114, 141/166, 141/315
[51] Int. Cl. ................................................. B65b 1/26
[50] Field of Search ........................................ 141/314, 1,
10, 67, 68, 71, 81, 114, 166, 313—317, 59;
222/194; 248/95, 99, 101

[56] References Cited
UNITED STATES PATENTS

| 2,540,059 | 1/1951 | Stirn et al. | 222/194 X |
| 2,907,499 | 10/1959 | Agronin | 222/194 X |
| 789,085 | 5/1905 | Dary | 248/99 X |
| 1,016,498 | 2/1912 | Heybach | 141/71 |
| 1,940,826 | 12/1933 | Stetson | 141/313 |
| 2,322,090 | 6/1943 | Hobbie | 248/101 |
| 3,245,200 | 4/1966 | Shaw | 141/329 X |
| 3,339,595 | 9/1967 | Pechmann | 141/67 X |
| 3,097,459 | 7/1963 | Rausch | 141/314 X |
| 3,140,735 | 7/1964 | Windle et al. | 141/314 X |
| 3,384,134 | 5/1968 | Hillerns | 141/314 X |

*Primary Examiner*—Laverne D. Geiger
*Assistant Examiner*—Edward J. Earls
*Attorney*—Diller, Brown, Ramik & Holt ABSTRACT: Flexible containers are provided in a flat state to a filler and units of pulverulent material having a substantial portion of entrained gases removed therefrom are deposited into the container with the container progressively opening as it is being filled whereby, for all practical purposes, only a minimum amount of air may be added to the compacted pulverulent material delivered into the container. Rollers may be provided for engaging opposite surfaces of the container so as to hold the same closed beneath the material being placed therein and to progressively permit the opening of the container as it is being filled. Special means, including adapter frames, are provided for clamping the mouth of a container in sealed relation to the filler. Also, in order to provide accurate weights within each filled container, weighing mechanisms may be provided in advance of the filler, the weighing mechanism operating alternately whereby while a new charge is being weighed, a previously weighed charge is being directed into a container by the filling mechanism.

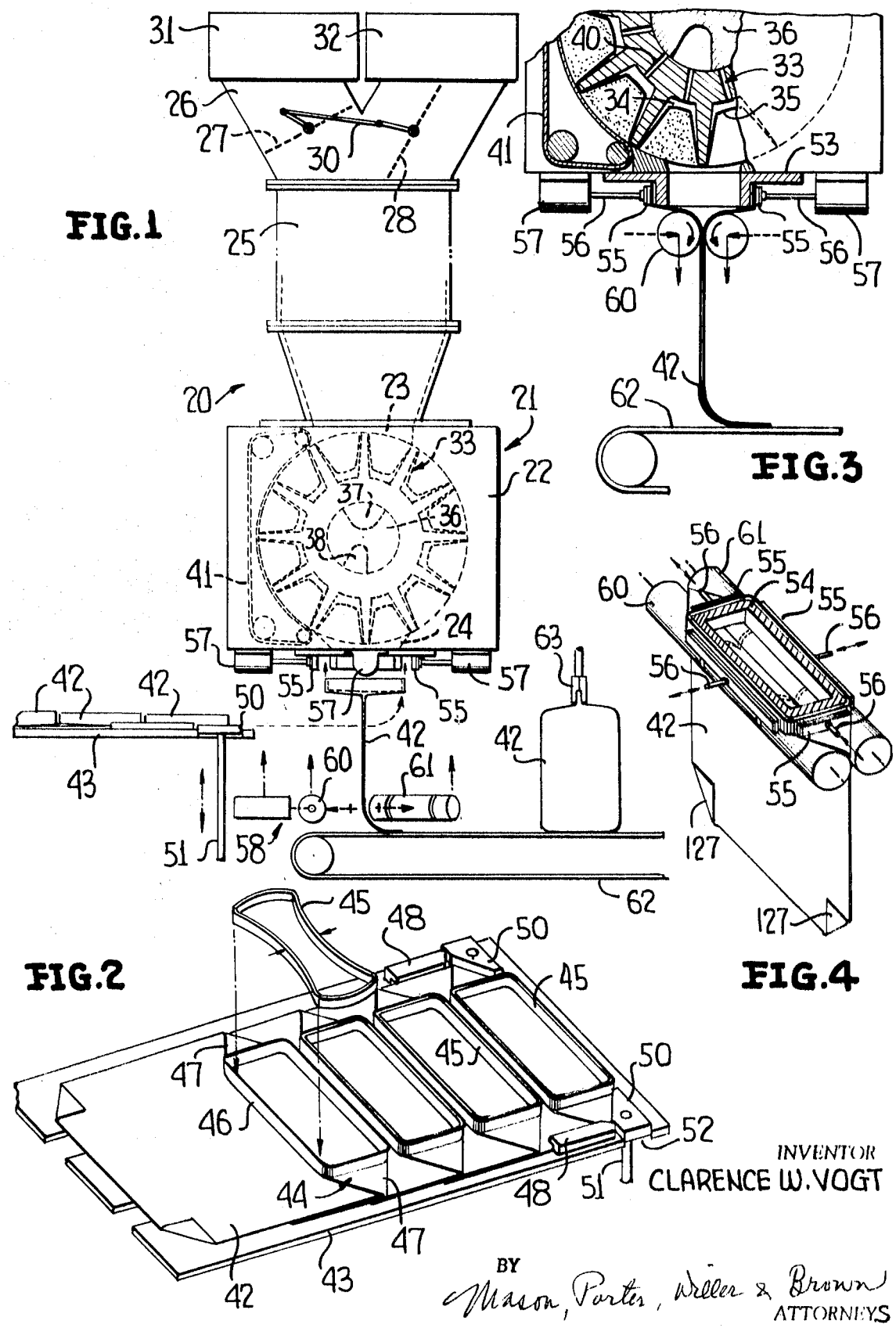

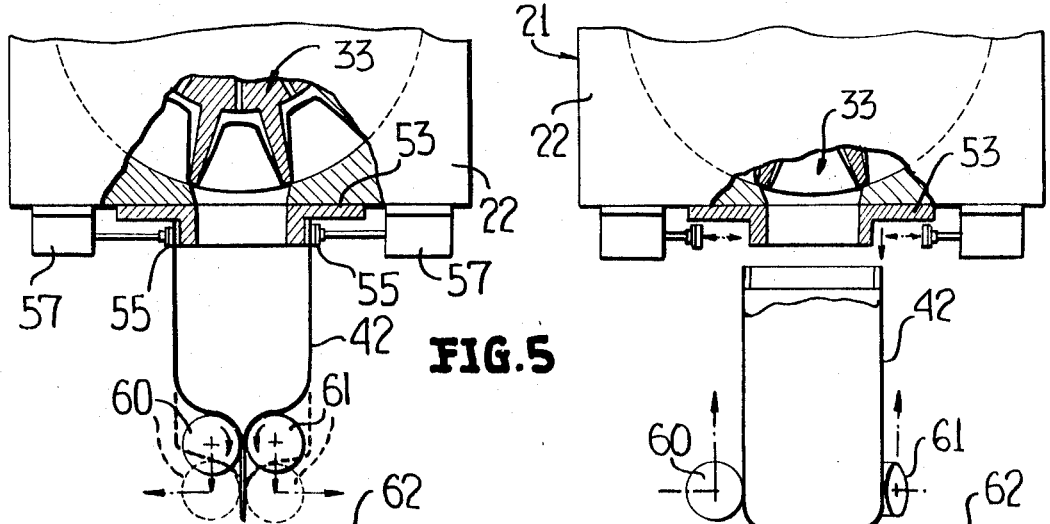
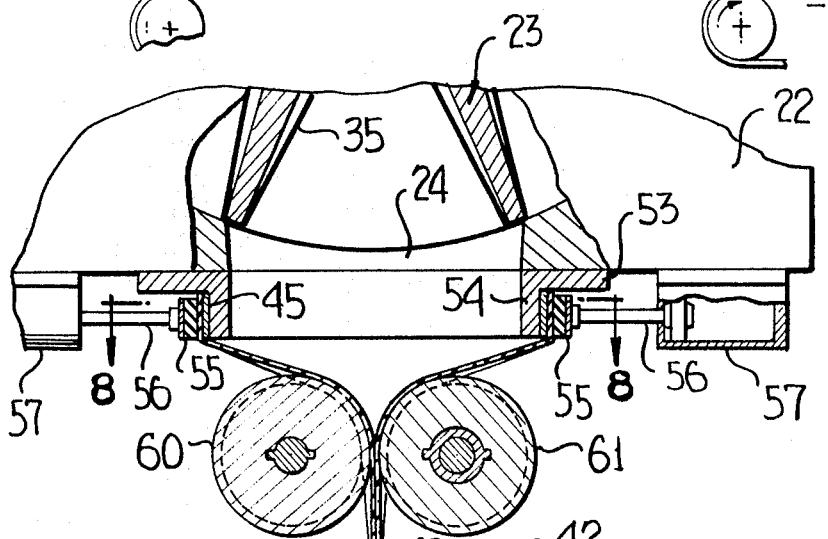
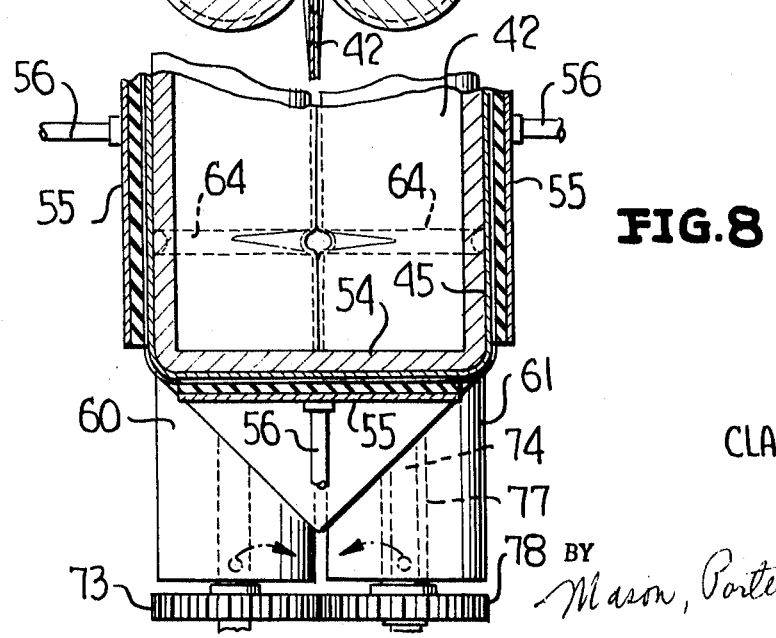

INVENTOR
CLARENCE W. VOGT

BY Mason, Porter, Diller & Brown
ATTORNEYS

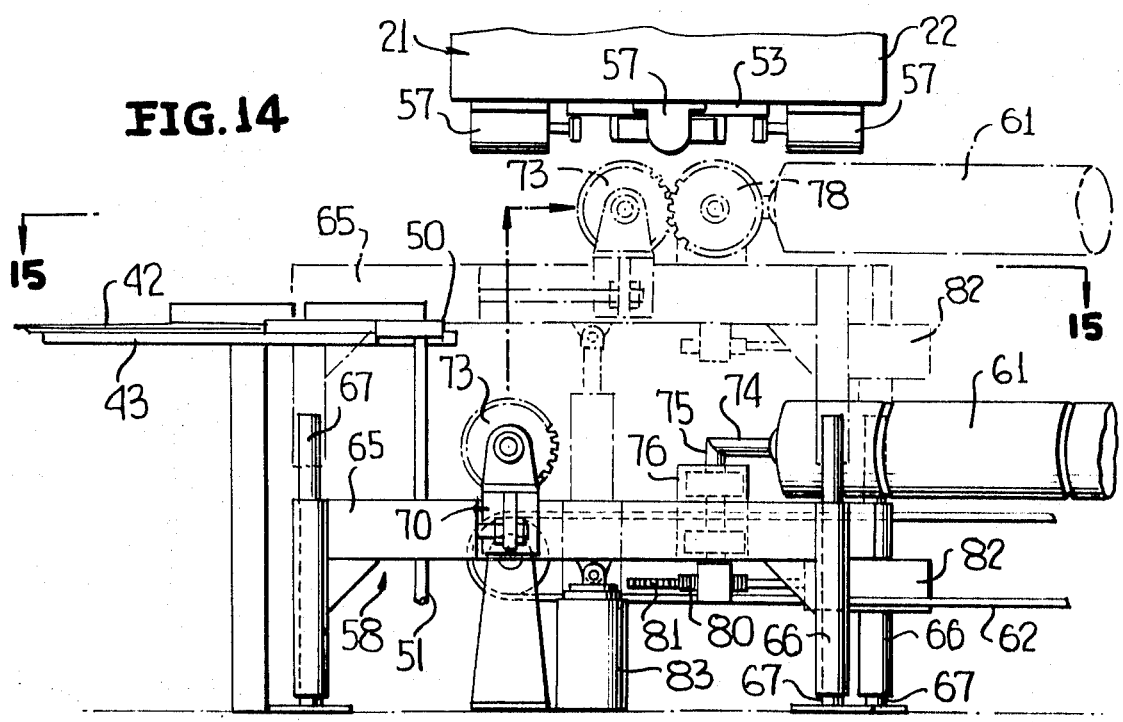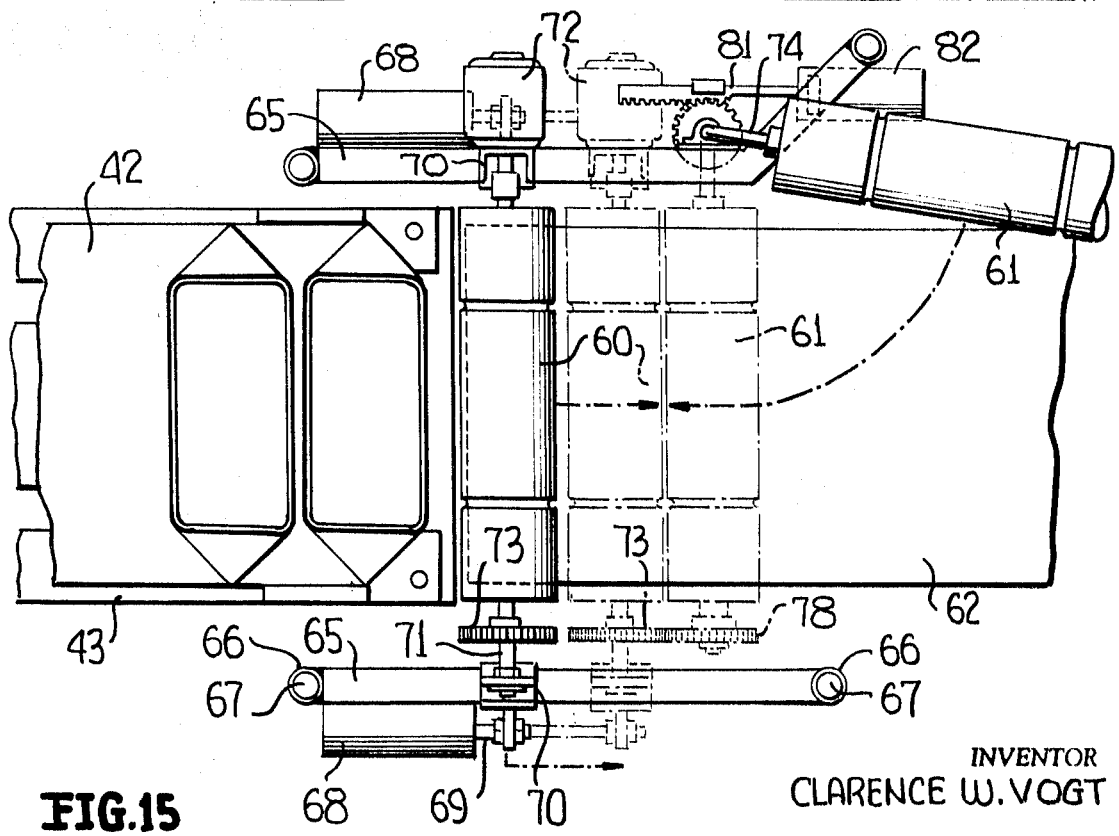

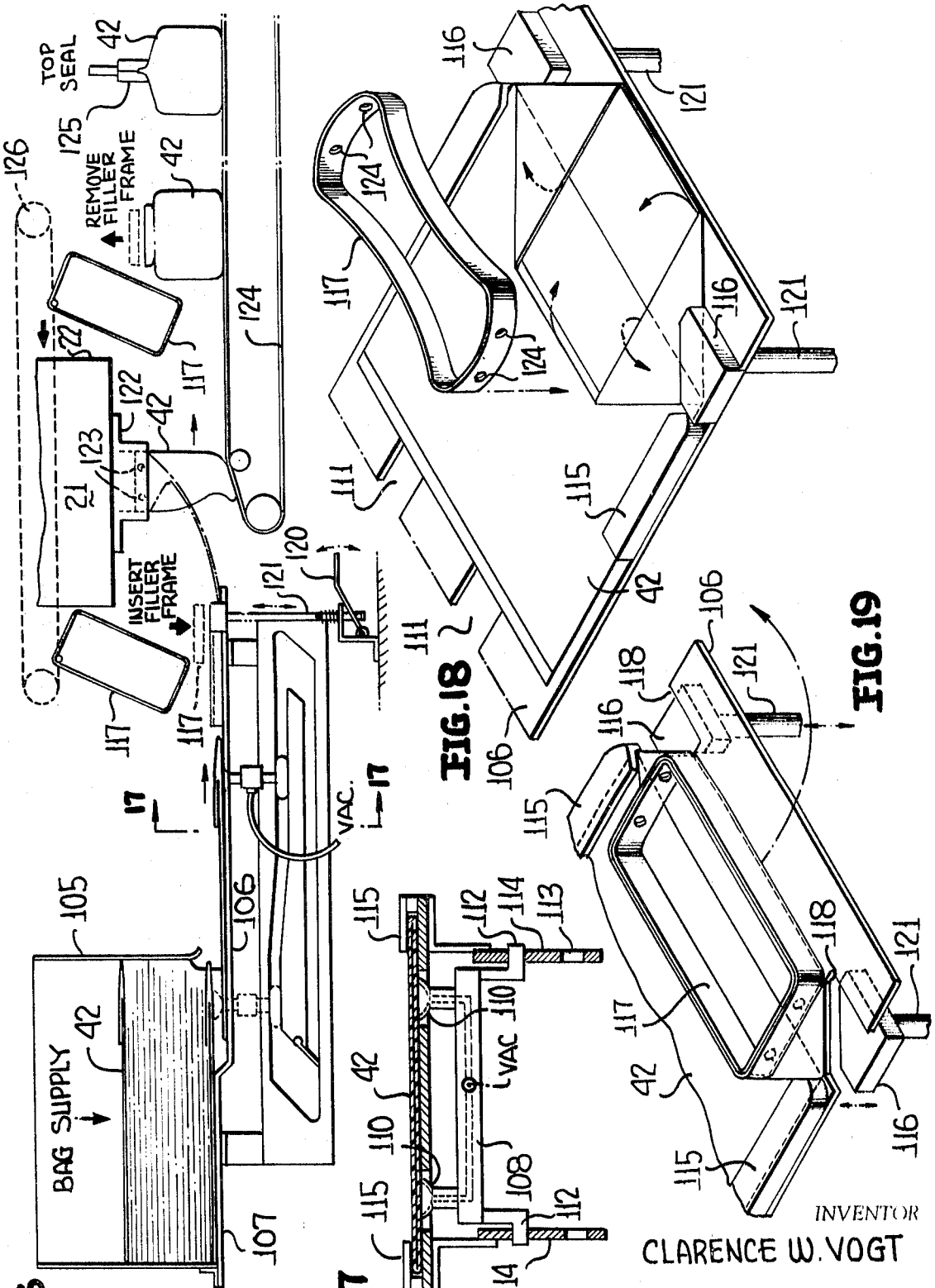

FILLING APPARATUS

This invention relates in general to new and useful improvements in filling mechanisms, and more specifically to a rotary filler which may be utilized to fill flexible containers with pulverulent material which is substantially compacted.

In accordance with this invention, it is proposed to secure the mouth of a flattened flexible container to a rotary filler and then utilizing the rotary filler, form compacted charges or units of pulverulent material and deposit the same, substantially air-free, into the container. The container progressively opens as it is being filled without the introduction of air whereby when the filling of the container is completed, the compacted units remain compacted and substantially air-free so that the fill within the container is a compacted fill although compaction thereof within the container may not occur.

A primary feature of this invention is providing means for securing the mouth of a flattened flexible container to the filler in sealed relation thereto and with the container being suspended from the filler whereby the connection is air free and at the same time provides adequate support for the container as it is being filled.

Another feature of this invention is the provision of an adapter frame which is readily insertable within the mouth of a flexible container and which is utilized in the securement thereof to a filler in retained sealed relation with respect thereto.

Still another object of this invention is to provide a filling apparatus which includes a rotary filler and which is provided with at least two independent supplies, each of the supplies including a weighing mechanism with the filler serving to deliver a previously weighed charge to a container in substantially compacted relation while the second weighing unit is weighing a further charge.

A further object of this invention is to provide a novel method of filling flexible containers with pulverulent material wherein although the pulverulent material may not be compacted after it is placed within the container, the container is filled with substantially compacted material.

A still further object of this invention is to provide a novel filling mechanism which may be utilized for the filling of relatively large flexible containers, such as plastic bags, with pulverulent material and wherein there is a substantial compaction of the pulverulent material within the container even though there may be no compaction action on the pulverulent material after it is placed within the container.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is an elevational view showing the filling mechanism which is the subject of this invention and shows a bag to be filled being placed in position.

FIG. 2 is a top perspective view of mechanism for facilitating the positioning of adapter frames in the valves of bags prior to the connection of the bags to the filling mechanism.

FIG. 3 is an enlarged fragmentary elevational view showing the relationship of the bag clamped to the underside of the filling head and prior to the placing of any material therein, a portion of the filling head being broken away and shown in section in order to illustrate the details thereof.

FIG. 4 is a schematic top perspective view showing the bag of FIG. 3 having associated therewith the rollers which clamp the same shut and the means which secure the same to the filling head.

FIG. 5 is a fragmentary elevational view similar to FIG. 3 and shows the bag in a partially filled condition.

FIG. 6 is another elevational view similar to FIG. 3 and shows the bag in its fully filled position and released from the filling head.

FIG. 7 is an enlarged fragmentary elevational view similar to FIG. 3 with parts broken away and shown in section and specifically illustrates the relationship between a collapsed container and the filling mechanism.

FIG. 8 is an enlarged fragmentary horizontal sectional view taken along the line 8-8 of FIG. 7 and shows further the relationship of the collapsed container and the filling mechanism including the details of rolls for retaining the container in its flat state.

FIG. 14 is a fragmentary elevational view and shows the specific details of the manner in which the rolls for controlling the flattened state of a container may be mounted for the required movement thereof.

FIG. 15 is a fragmentary horizontal sectional view taken along the line 15-15 of FIG. 14 and shows further the specific details of the mounting and driving of the rolls.

FIG. 16 is a schematic elevational view showing another form of filling mechanism in accordance with this invention.

FIG. 17 is an enlarged fragmentary transverse vertical sectional view showing the manner in which individual containers may be transferred.

FIG. 18 is an enlarged plan view of one end of the bag support and positioner and shows an adapter ring in its collapsed relation.

FIG. 19 is a fragmentary perspective view similar to FIG. 18 and shows the adapter ring inserted in an open mouth of a container.

Figure 9:
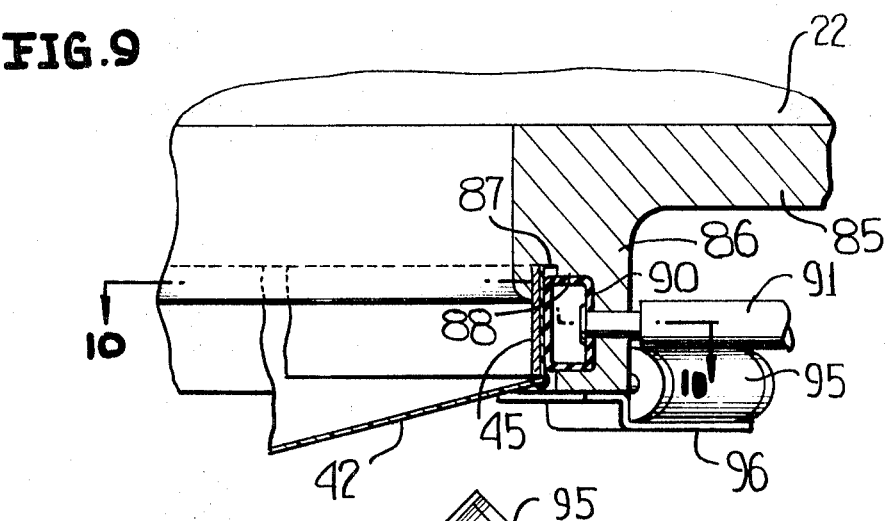
FIG. 9 is an enlarged fragmentary vertical sectional view taken through the lower portion of the filling head and shows a modified form of clamp assembly for securing a flexible container thereto.
Figure 10:
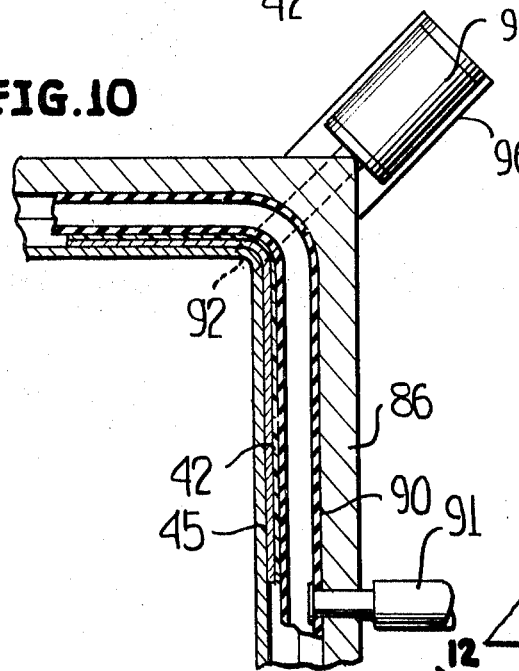
FIG. 10 is an enlarged fragmentary horizontal sectional view taken along the line 10-10 of FIG. 9 and shows further the details of the clamp assembly.
Figure 12:
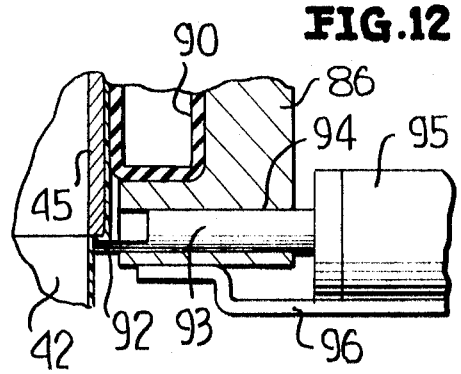
FIG. 12 is an enlarged fragmentary vertical sectional view taken along the line 12-12 of FIG. 11 and shows further the details of the detent and the relationship thereof with respect to an adapter frame.

Referring now to the drawings in detail, it will be seen that there is illustrated in FIG. 1 a filling mechanism formed in accordance with this invention, the filling mechanism being generally referred to by the numeral 20. The filling mechanism 20 includes a rotary filling head 21 which includes a housing 22 having an uppermost inlet 23 and a lowermost outlet 24. There is secured to the upper part of the housing 22 in alignment with the inlet 23 a hopper assembly 25. The hopper assembly 25 includes an upper bifurcated portion 26 in which there is positioned a pair of valves 27 and 28 which are interconnected by a mechanism 30 in a manner wherein when one of the valves is opened, the other of the valves is closed. The bifurcated hopper portion 26 is connected to the discharges of a pair of conventional weighing mechanisms 31 and 32, the flow from which is controlled by the valves 27 and 28, respectively.

The filling head 21 also includes an impeller 33 which is mounted within the housing 22 for controlled rotation. As is clearly shown in FIG. 3, the impeller 33 is constructed to define a plurality of circumferentially spaced, closely adjacent sockets 34. In each socket 34 there is positioned a pocket defining liner 35 which is formed of a shape retaining porous material through which air and other gases may freely pass, but will exclude the passage of pulverulent material which the filling mechanism 20 is intended to handle.

The filling head 21, which of itself is not a part of this invention, is also provided with a valve 36 which is positioned centrally of the impeller 33 and which is fixed against rotation. The valve 36 includes two ports 37 and 38 which are selectively communicated with the interiors of the sockets 34 through radial ports 40. The ports 37 and 38 are connected to sources of vacuum and pressure, respectively, in a manner which is not a part of this invention.

It is also to be noted that the housing 22 has mounted therein an endless belt 41 which is suitable journaled for continuous rotation with a portion thereof forming an exterior wall of the impeller 33 substantially between the inlet 23 and the outlet 24. This prevents a rubbing action of material carried by the liners 35 with the housing 22.

In accordance with this invention, it is the desire to fill flexible containers, such as flexible bags, which may conveniently be formed of plastic or like material, with pulverulent material which has been compacted within the filling head 21 and which remains substantially in a compacted state without the addition of air thereto after it is placed within the containers. A typical container is identified by the numeral 42.

Referring now to FIG. 2 in particular, it will be seen that the containers 42 are prepared for association with the filling head 21 on a support 43 which is positioned adjacent one side of the filling head 21. The containers 42 are supplied in their flat state and have mouth portions 44 which are configured so as to be upstanding. The mouth portions 44 of the containers 42 are intended to have positioned therein an adapter frame 45. The adapter frame 45 has a generally rectangular outline. However, when the central portions thereof are drawn inwardly, as is shown in the upper portion of FIG. 2, it is collapsed in size and is readily receiveable in a mouth portion 44. It is to be noted that it is preferred that the containers 42 each include an upstanding flange 46 which is part of the mouth portion 44 thereof and in which the adapter ring 45 is received. The mouth portion 44 of each bag is provided on the opposite side of each upstanding flange 46 with a triangular gusset 47 which retains the shape thereof.

Although the adapter ring 45 is positionable within the mouth portion 44 without any special equipment, the insertion thereof may be facilitated by the proper holding of a container in position. Accordingly, at one end of the support 43 there is provided a pair of recessed guide blocks 48 under which the containers pass. Also, there is provided a pair of stop locks 50 which are carried by rods 51 and normally supported above the surface of the support 43, but are withdrawable down therethrough through aligned notches 52 formed therein.

Referring now to FIGS. 7 and 8 in particular, it will be seen that the housing 22 of the filler head 21 is provided with a container mounting adapter 53 in alignment with the outlet 24. The adapter 53 is provided with a dependent flange 54 of a size to be snugly received in one of the adapter rings 45 after the same has been positioned in the mouth portion 44 of a container 42. After an adapter ring 45 has been telescoped over the flange 54, it and an associated container mouth portion are clamped in place by two sets of opposed clamps 55, which clamps may have resilient faces if desired. Each clamp 55 is carried by a piston rod 56 of a fluid cylinder 57. It is to be understood that the fluid cylinders 57 may be suitably actuated to effect the projection or withdrawal of the clamps 55.

Referring now once again to FIG. 1 in particular, it will be seen that there is provided means for engaging opposite faces of a container 42 and retain the same in a flat condition as it is being filled so as to exclude the introduction of undue air into the container. The means is generally referred to by the numeral 58 and will be described in more detail hereinafter. However, it basically includes a pair of rollers 60, 61 which are engageable with opposite surfaces of a flattened container 42 immediately below the filler head 21 and which are movable downwardly as the filling of the container 42 progresses, as is schematically shown in FIG. 3.

In order that a filled container may be supported and moved away from the filling mechanism 21, there is provided an endless conveyor 62 underlying the filler head 21. It is to be noted from FIG. 5 that the conveyor 62 does not support the container 42 until it is finally filled and released from the filler head 21, as is shown in FIG. 6. At this time, the roller 61 moves to an out of the way position, as is shown in FIG. 6, and the container 42, filled with compacted material, moves along the conveyor 62 and the upper end thereof is sealed closed by means of a suitable sealing mechanism 63. At this time it is pointed out that the purpose of the filling mechanism 20 is to fill the container 42 with pulverulent material in a manner wherein the pulverulent material is compacted much greater than that which would occur if the pulverulent material was merely delivered by gravity to the container 42. The filler head 21 functions to remove a major portion of the entrained gases within the pulverulent material due to the vacuum produced in the pocket defining liners 35. When a compacted unit of the material is dropped into the upper part of the container 42, it does have a tendency to break up and again have air entrained therein. However, inasmuch as the container 42 is supported adjacent the mouth portion thereof in an initial filling phase, as is shown in FIG. 3, there is not much tendency of the compacted unit of material to break up. Furthermore, for all practical purposes, there is no air available to mix with the material inasmuch as the container 42 is initially collapsed and only a minute amount of air necessary to effect the discharge of the compacted material is introduced through the port 40 and a major portion thereof is retained within the socket 34.

Inasmuch as the rollers 60, 61 are moved downwardly in unison at the same rate as the container 42 is being filled, the compacted material being delivered to the container 42 only drops a short distance and does not materially break up. At the same time, it does not absorb a large quantity of air inasmuch as none is available.

The filling of the container 42 and the downwardly movement of the rollers 60, 61 continues until the rollers reach their dotted line positions of FIG. 5, at which time the rollers move apart and the container 42, if it is formed of a stretchable plastic material, will stretch and be seated on the conveyor 62. Shortly thereafter, the filling operation will cease, after which the container 42, which is compactly filled with the pulverulent material, is ready to move along with the conveyor belt 62. At this time, the roller 61 is moved to its out of the way position. Thereafter, it is merely necessary to remove the adapter ring 45 and seal the mouth portion of the container.

Referring now to FIGS. 7 and 8 in particular, it is to be noted that there is the possibility that a certain amount of air will be entrapped in the lower portion of the container 42 although it is initially flattened. In order to facilitate the removal thereof, it will be that the rollers 60,61 are provided with annular grooves 64 which do not prevent the escape of such air. The manner in which the grooves 64 function is clearly illustrated in FIG. 8.

Reference is now made to FIGS. 14 and 15 wherein there is illustrated more specifically the details of the container flattening means 58. The means 58 includes a generally horizontal frame formed of a pair of longitudinal frame rails 65 which are disposed on opposite sides of the endless belt conveyor 62 and the support 43. At the opposite ends of the frame rails 65, there are vertical sleeves 66 which are telescoped over vertical supports 67. The frame rails 65 may be interconnected, as found necessary.

The frame rails 65 are provided adjacent one end thereof with horizontally disposed fluid motors 68 each having a piston rod 69 connected to a support 70 which is slidably mounted on the respective frame rail. The supports 70 mount for rotation a shaft 71 which is driven by a drive unit 72 carried by one of the supports 70. The end portion of the shaft 71 remote from the drive unit 72 is provided with a gear 73 for the purpose of driving the roller 61.

The roller 61 is mounted for rotation on a horizontal shaft 74 which has a vertical portion 75 carried for pivoting by means of suitable vertical bearing elements 76 carried by the same frame rail 65 as that with which the drive unit 62 is associated. The roller 61 is swingable from an out of the way position, as shown in FIG. 15 in solid lines to an operative position, as is shown in phantom lines. As is best shown in FIG. 8, the roller 61 has a sleeve 77 which is journaled on the shaft 74 and which sleeve 77 carries a gear 78 that is meshed with the gear 73.

In order that the roller 61 may be selectively positioned, there is carried by the lower portion of the vertical shaft 75 a gear 80 which is meshed with a rack 81 which is horizontally disposed and which is horizontally reciprocal. The rack 81 is driven by a suitable motor 82, which motor is preferably a fluid motor.

The frame 58 is vertically movable by means of a pair of telescoping fluid motors 83 which are secured to the respective frame rails 65 and which are actuated in unison. At this time, it is to be understood that suitable control means may be provided for the automatic actuation of the fluid motors 83, 68 and 82 in timed relation to the filling of a container.

Reference is now made to FIGS. 9 through 12 wherein there is illustrated another form of means for securing a container to the filler head 22 in sealed relation thereto. The housing 22 of the filler head may be provided with an adapter 85 which is generally rectangular in plan in accordance with the configuration of a container mouth and which adapter includes a depending flange 86. The flange 86 is internally configured so as to define a socket 87 in which the adapter ring 45 and an upper part of a container 42 is received, as is clearly shown in FIG. 9. In addition, the flange 86 is recessed as at 88 and has received therein a sealing ring 90. The sealing ring 90 is of a tubular construction and is inflatable. In order to facilitate the inflation and deflation of the sealing ring 90, there is attached thereto a line 91 for a suitable fluid. The introduction and removal of fluid from the sealing ring 90 will be accomplished in any desired conventional manner.

In addition to the sealing ring 90, the adapter 85 is provided at each of the corners of the flange 86 with a detent 92. The detent 92, when properly positioned, underlies the adapter ring 45 and the upper portion of the container 42 and serves to secure the same in place in the socket 87.

Each of the detents 92 is carried by a plunger 93 which is slidable within a bore 94 formed in the lower part flange 86. The plunger 94 is part of a power unit 95 which is operable to effect axial movement of the plunger 93. The power unit 95 may be in the form of a solenoid, a fluid motor, etc. The power unit 95 is carried by a suitable bracket 96 suitably secured to the flange 86.

Figure 13:
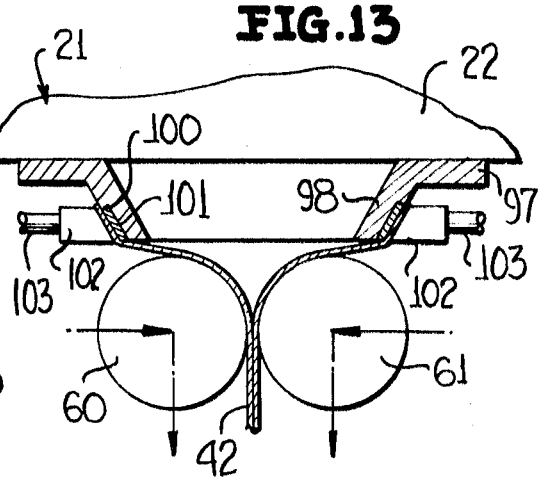
FIG. 13 is an enlarged fragmentary vertical view with parts broken away and shown in section, the view being similar to FIG. 3 and shows a modified form of container mouth clamping mechanism.
Figure 11:
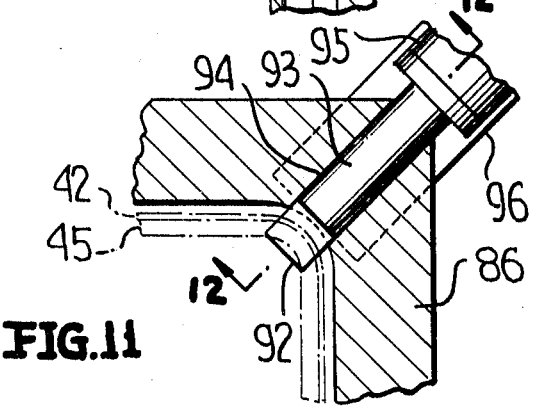
FIG. 11 is an enlarged fragmentary horizontal sectional view somewhat similar to FIG. 10 and shows specifically the details of a detent disposed at the corner of the bottom portion of the filling head.

Reference is next made to FIG. 13 wherein still another means for securing a container to the filler head 21 in sealed relation thereto is illustrated. The housing 22 of the filler head 21 is provided with an adapter 97 which includes a downwardly tapering flange 98. The flange 98 will have a plan configuration corresponding generally to that of the container. The outer surface of the flange 98 is recessed as at 100 and has seated therein a peripheral sealing ring 101. It is to be understood that a mouth of the container 42 is to be slid up over the flange 98 in position to be sealed against the sealing ring 101.

In order to effect the tight clamping and sealing of the mouth portion of the container 42 to the adapter 97, the housing 22 also carries suitable clamp means of the general type utilized in the embodiment of FIG. 1. Along each side of the flange 98 there is a clamp member 102 which is carried by a plunger 103. Each plunger 103 may be part of a fluid motor or other type of extensible power unit.

Although in most instances it will be desired to clamp the container 42 being filled by means of suitable clamp means such as the rollers 60 and 61, it is feasible to obtain the desired compaction within the container without utilizing such means. A typical arrangement for so filling containers is shown in FIG. 16.

With particular reference to FIG. 16, it will be seen that there is provided a hopper 105 in which specially folded ones of the containers 42 are positioned. The hopper overlies a support 106 which includes an upwardly offset end portion 107 and forms a bottom portion of the hopper. The support 107 has associated therewith a transfer mechanism 108 which includes a pair of transversely aligned suction heads 110 (FIG. 17) which are movable in slots 111 formed in the support 106. The transfer mechanism 108 includes followers 112 which are positioned in guide tracks 113 of guide plates 114. A suitable reciprocating mechanism (not shown) will be connected to the transfer mechanism 108 to effect the longitudinal reciprocation thereof.

The containers 42 are moved along the support 106 with the edges thereof passing under guides 115 and until they come into engagement with stops 116. The containers 42 are now positioned for the insertion of adapter rings 117 thereinto. The adapter rings 117 may be identical with the adapter rings 45 or may be of a slightly different configuration, as will be described hereinafter.

After the adapter rings 117 have been positioned within the mouth portions of the containers 42, as is shown in FIG. 19, the stops 116 are moved downwardly through aligned cutouts 118 in the support 106 by depressing a treadle mechanism 120 which is attached to support rods 121 for the stops 116. The container, together with the adapter ring, is then moved into engagement with an adapter frame 122 carried by the underside of the housing 22. The adapter frame 122 is configured to receive therein the mouth portion of the container and the adapter ring 117. The adapter frame 122 is provided with suitable detents 123 which are cooperable with openings 124 formed in opposite ends of the adapter ring 117 to lock the adapter frame and the mouth portion of the container 42 in place.

As the container 42 is progressively filled utilizing the filler head 21, the container 42 is drawn off of the support 106 and drops down into an endless conveyor belt 124. At the time the container 42 is substantially filled, it will be resting fully on the conveyor belt 124 and is ready to be transferred thereby to a point where the adapter ring 117 may be removed. Thereafter, the filled container 42 moves to a position wherein the open end thereof is closed by means of a sealer 125. The adapter rings 117 may be returned to a position adjacent the support 106 by means of a suitable conveying mechanism 126 which is schematically illustrated.

It is to be understood that inasmuch as the mouth portion of the container 42 is sealed relative to the filler head 21, the free flow of air into the container 42 is prevented, and therefore, the material deposited into the container 42 remains in its compacted state even though the container 42 may have a tendency to open in advance of being filled.

At this time it is also pointed out that the containers 42 may be of various configurations. When the container 42 is in the form of a bag, it may have the lower corners thereof folded to define flaps 127 which will facilitate the opening of the container 42 in a manner to permit pouring of the material disposed therein.

It is further pointed out that although weighting mechanisms have been specifically illustrated as being arranged for preweighing material placed within the containers 42, with many pulverulent materials it is possible to obtain uniform weights within each of the pockets defined by the liners 35 so that it is not necessary to preweigh the material being placed in the containers. It is only necessary to accurately size the liners 35 so that predetermined unit weights will be dispensed and then the impeller 33 rotated a predetermined number of pockets to accurately fill the containers 42.

Although several preferred embodiments of the invention have been specifically illustrated and described herein, it is to be understood that other variations may be made in the filling mechanism without departing from the spirit and scope of the invention, as defined by the appended claims.

I claim:

1. A filler particularly adapted for filling flexible containers including bags, said filler comprising a filling head including a housing, an impeller mounted within said housing for continuous rotation about a horizontal axis during a bag-filling operation, said impeller having a plurality of circumferentially adjacent transfer pockets, said impeller and said housing having cooperating pneumatic pressure differential means for removing entrained gases from and releaseably compacting pulverulent materials in said transfer pockets, and securing means on the underside of said housing for clamping a mouth portion of a flexible container to said housing in sealed relation, said filler being particularly adapted for filling collapsible containers while collapsed, and said filler including container engaging means for retaining a container in collapsed position and facilitating the gradual opening thereof starting at the container mouth as a container is being filled whereby a compacted fill is effected.

2. A filler particularly adapted for filling flexible containers including bags, said filler comprising a filling head including a housing, an impeller mounted within said housing for continuous rotation about a horizontal axis during a bag-filling operation, said impeller having a plurality of circumferentially adjacent transfer pockets, said impeller and said housing having cooperating pneumatic pressure differential means for removing entrained gases from and releaseably compacting pulverulent materials in said transfer pockets, and securing means on the underside of said housing for clamping a mouth portion of a flexible container to said housing in sealed relation, said filler being particularly adapted for filling collapsible containers while collapsed, and said filler including container-engaging means for retaining a container in collapsed position and facilitating the gradual opening thereof as a container is being filled.

3. The filler of claim 2 wherein said container-engaging means includes a pair of rollers adapted to clamp a container secured to said housing adjacent the mouth of such container, and means for gradually moving said rollers towards a closed end of such container as the container is being filled.

4. The filler of claim 3 wherein said rollers have means for facilitating the escape of air trapped within a container below said rollers.

5. The filler of claim 3 wherein means are provided for separating and bringing together said rollers in timed relation to the filling of containers.